(12) United States Patent
Wishard

(10) Patent No.: US 9,506,002 B2
(45) Date of Patent: Nov. 29, 2016

(54) SYSTEM TO DRY, CONDENSE AND STERILIZE WASTE MATERIALS FOR REUSE

(71) Applicant: John Wishard, Fallbrook, CA (US)

(72) Inventor: John Wishard, Fallbrook, CA (US)

(73) Assignee: VALENCIA PARTNERS, LLC, Fallbrook, CA (US)

(*) Notice: Subject to any disclaimer, the term of this patent is extended or adjusted under 35 U.S.C. 154(b) by 77 days.

(21) Appl. No.: 14/511,483

(22) Filed: Oct. 10, 2014

(65) Prior Publication Data

US 2015/0218478 A1   Aug. 6, 2015

Related U.S. Application Data

(60) Provisional application No. 61/936,018, filed on Feb. 5, 2014.

(51) Int. Cl.
*C10L 5/40* (2006.01)
*C10L 5/04* (2006.01)
*C10L 5/46* (2006.01)

(52) U.S. Cl.
CPC ............... *C10L 5/406* (2013.01); *C10L 5/04* (2013.01); *C10L 5/40* (2013.01); *C10L 5/46* (2013.01); *C10L 2200/0469* (2013.01); *C10L 2290/06* (2013.01); *C10L 2290/08* (2013.01); *C10L 2290/24* (2013.01); *C10L 2290/28* (2013.01); *C10L 2290/50* (2013.01); *C10L 2290/56* (2013.01); *Y02E 50/30* (2013.01)

(58) Field of Classification Search
CPC ............ A61L 2/04; C10L 5/04; C10L 5/406
USPC .......................................... 422/292; 44/629
See application file for complete search history.

(56) References Cited

U.S. PATENT DOCUMENTS

| 5,340,036 | A | 8/1994 | Riley |
| 5,465,503 | A | 11/1995 | Oates |
| 6,471,767 | B1 | 10/2002 | Konczak |
| 6,893,559 | B2 | 5/2005 | Kin et al. |
| 7,211,187 | B2 | 5/2007 | Lumbert |
| 2011/0212239 | A1 | 9/2011 | Carin et al. |

*Primary Examiner* — Sean E Conley
(74) *Attorney, Agent, or Firm* — Plager Schack LLP

(57) ABSTRACT

A waste processing system to dry, condense and sterilize waste materials to a final product for reuse enhances efficiency while eliminating greenhouse gas emissions. The system includes a mixing chamber with blades to shred the waste materials, a pressurized chamber operably connected to the mixing chamber and including a heating ducting operated by a control system, the control system able to heat the waste materials received by the pressurized chamber from the mixing chamber to a temperature within a predetermined temperature range for a time period to eliminate moisture from the waste materials, and an auger housed within the pressurized chamber and operably connected to an auger motor. The auger extrudes the heated waste materials through an outlet in the pressurized chamber to form the final product for reuse.

11 Claims, 4 Drawing Sheets

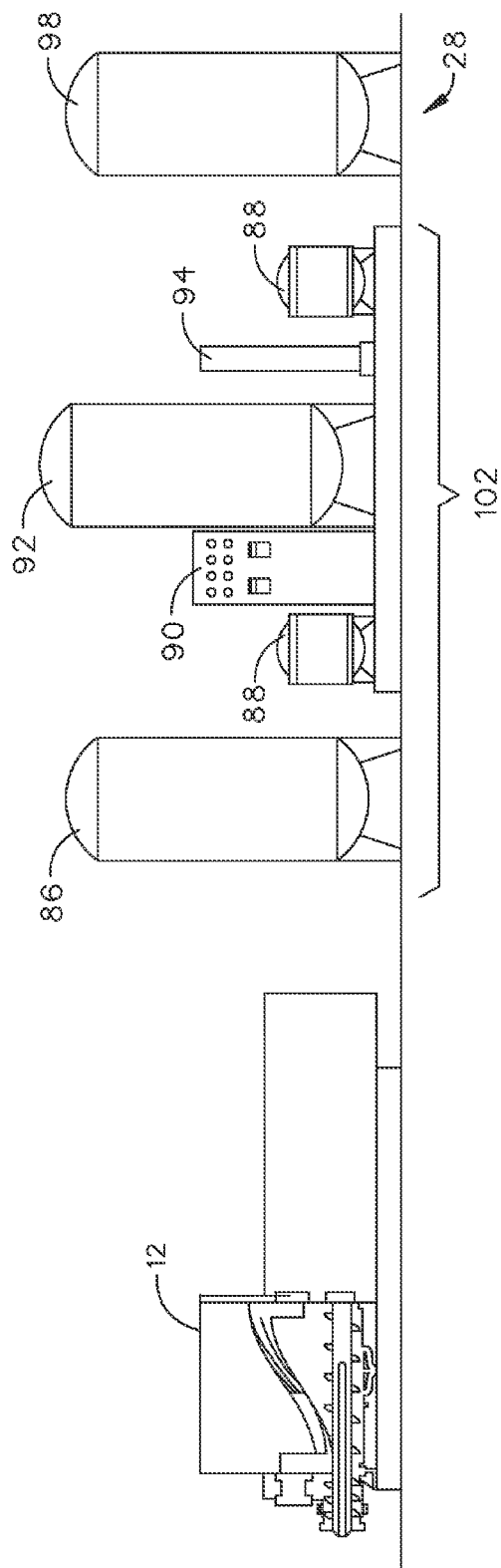

US 9,506,002 B2

SYSTEM TO DRY, CONDENSE AND STERILIZE WASTE MATERIALS FOR REUSE

RELATED APPLICATION

The application claims priority to provisional patent application U.S. Ser. No. 61/936,018 filed on Feb. 5, 2014, the entire contents of which is herein incorporated by reference.

BACKGROUND

The embodiments herein relate to Materials Recovery Facility processes and systems for processing waste materials.

Waste materials such as mixed plastics, rubbers and food wastes contain a high moisture content, which leads to the decay and growth of bacteria within the waste. The high moisture content of wastes limit its ability to be processed so that it can be converted into energy or used as raw materials in other applications. Waste materials that cannot be processed for reuse contribute to the growing volume of trash in landfills across the country.

Currently, there are several systems that process waste materials for reuse such as tunnel dryers. However, these systems are limited because they are bulky machines that often extend up to 100 feet long. This makes it impractical and/or difficult to operate these systems when space is limited. In addition, these systems are not economically feasible because they require significant amounts of natural resources such as fossil fuels, coal, natural gas, wood, or the like, to process the waste into reusable blocks. As a result, these systems are not environmentally friendly because the combustion of materials such as fossil fuels and natural gas emit greenhouse gases into the environment. Finally, these systems are not efficient because they do not effectively remove all moisture from the waste materials, which results in additional costs and/or processing time to convert the waste materials into a form that can be reused.

As such, there is a need in the industry for a cost-effective and efficient system for processing waste materials for reuse that eliminates the emission of greenhouse gases and overcomes the limitations of the prior art described above.

SUMMARY

A waste processing system to dry, condense and sterilize waste materials to a final product for reuse, the system configured to enhance efficiency while eliminating greenhouse gas emissions, the system comprising a mixing chamber comprising blades configured to shred the waste materials, a pressurized chamber operably connected to the mixing chamber and comprising a heating ducting operated by a control system, the control system being configured to heat the waste materials received by the pressurized chamber from the mixing chamber to a temperature within a predetermined temperature range for a time period to eliminate moisture from the waste materials, and an auger housed within the pressurized chamber and operably connected to an auger motor, wherein the auger is configured to extrude the heated waste materials through an outlet in the pressurized chamber to form the final product for reuse.

BRIEF DESCRIPTION OF THE FIGURES

The detailed description of some embodiments of the invention will be made below with reference to the accompanying figures, wherein the figures disclose one or more embodiments of the present invention.

FIG. 5 depicts a schematic view of certain embodiments of the waste processing system.

DETAILED DESCRIPTION OF CERTAIN EMBODIMENTS

Figure 1:
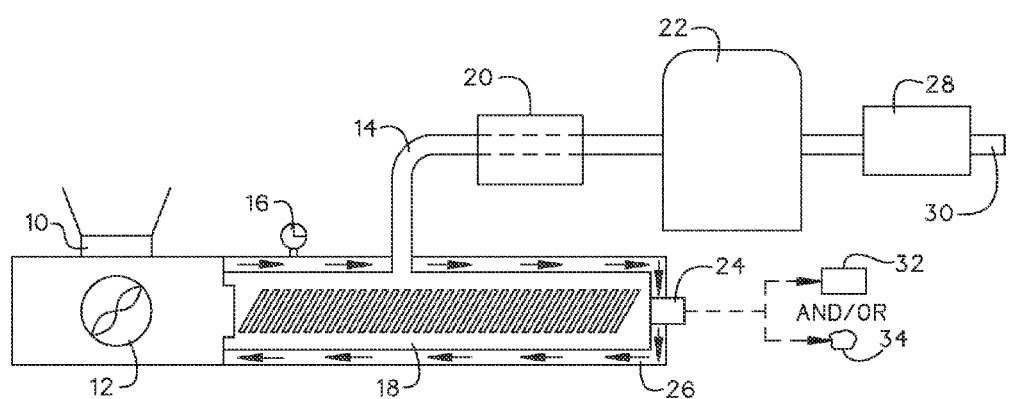
FIG. 1 depicts a schematic view of certain embodiments of the waste processing system.

As depicted in FIG. 1, the waste processing system comprises waste hopper 10, mixer 12, pressurized feed process vessel 18, heating ducting 26, extrusion outlet 24, control system 16, vacuum system 14, chemical cleansing system 20, steam condensate storage system 22, water storage and disposal system 28, and discharge channel 30. Any combination of waste materials including, but not limited to, mixed plastics, rubbers and food wastes are disposed in waste hopper 10, processed in mixer 12, heated in pressurized feed process vessel 18 by heating ducting 26, and then disposed out of extrusion outlet 24 as fuel blocks 32 or fuel chunks 34. The evaporated moisture from the heated waste materials in pressurized feed process vessel 18 are removed by vacuum system 14 and processed by chemical cleansing system 20, steam condensate storage system 22, and water storage and disposal system 28. The captured water in water storage and disposal system 28 is then transported by discharge channel 30 to a final destination such as a sewer system.

Figure 2:
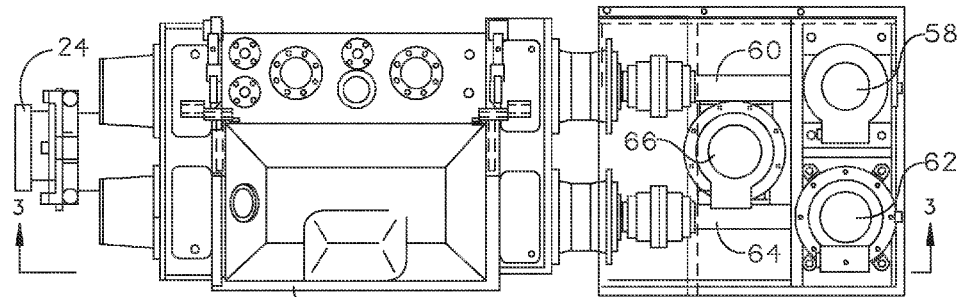
FIG. 2 depicts a schematic view of certain embodiments of the waste processing system.
Figure 3:
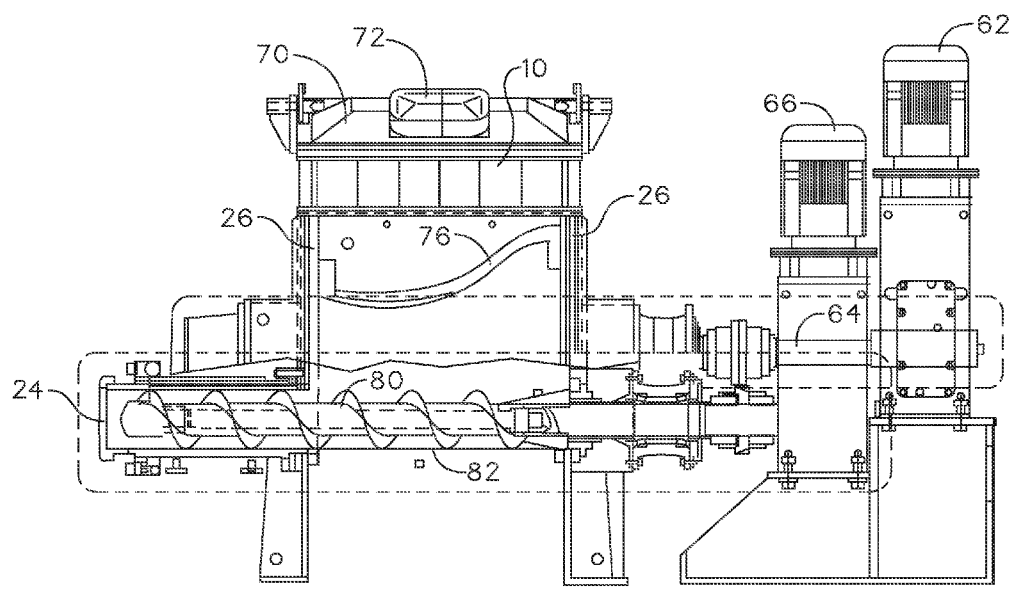
FIG. 3 depicts a section view of certain embodiments of the waste processing system taken along line 3-3 in FIG. 2.

FIGS. 2-3 depict mixer 12 and pressurized feed process vessel 18 in more detail. A top portion of mixer 12 comprises waste hopper 10, closeable lid 70 and sight glass 72. A pair of Z-shaped blades 76 is housed within mixer 12. Z-shaped blades 76 are made from carbon steel or stainless steel and are configured to shred and mix waste materials that do not contain migrant pieces of metal chunks. The first Z-shaped blade 76 is connected to first drive motor shaft 60 and first blade drive motor 58. The second Z-shaped blade 76 is connected to second drive motor shaft 64 and second blade drive motor 62.

Figure 4:
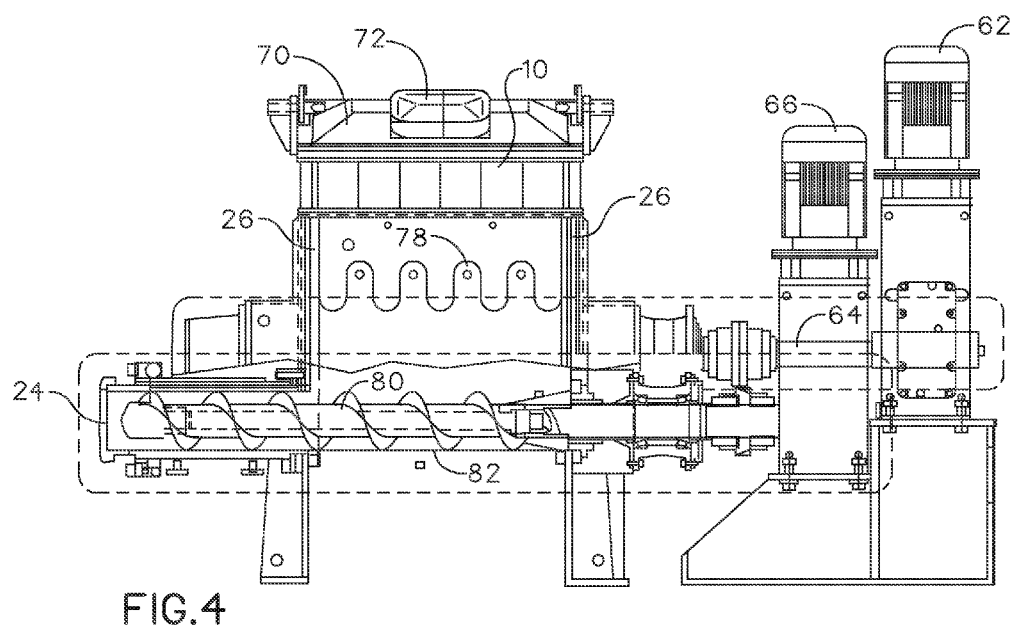
FIG. 4 depicts a section view of an alternative embodiment of the waste processing system.

In an alternative embodiment, a pair of butterfly blades 78 may be used instead of Z-shaped blades 76 as depicted in FIG. 4. Butterfly blades 78 are made from carbon steel or stainless steel and are connected to first drive motor shaft 60, first blade drive motor 58, second drive motor shaft 64 and second blade drive motor 62 in the same manner as described above. Butterfly blades 78 are configured to shred and mix waste materials that contain migrant pieces of metal chunks. However, butterfly blades 78 do not shred the waste materials as finely as Z-shaped blades 76. It shall be appreciated that butterfly blades 78 are more durable than Z-shaped blades 76 and have a lower likelihood that the blades will jam in the presence of migrant steel chunks in the waste materials. In alternative embodiments, it shall be appreciated that other types of blades, screws or mechanisms known in the field capable of mixing and shredding wastes can be used.

Heating ducting 26 is housed within mixer 12 and/or pressurized feed process vessel 18 and comprises an electrically operated hot oil jacket or electrical heating filaments. This heats the waste materials without combusting fossil fuels and therefore eliminates the emission of greenhouse gases into the environment. Auger 80 is housed within pressurized feed process vessel 18 and is connected to auger drive motor 66. In a preferred embodiment, first blade drive motor 58, second blade drive motor 62 and auger drive motor 66 are electrical motors each comprising 250 horsepower. However, alternative types of motors known in the field with variable horsepower ratings may be used instead.

To operate the waste processing machine, a user opens closeable lid 70 and deposits any type of waste materials in waste hopper 10 such as mixed plastics, rubbers, food wastes or alternative wet wastes. Generally, waste is shredded to portions that are 2 inches or less prior to being fed into waste hopper 10. Closeable lid 70 is sealed and the user can view the waste as it is processed through sight glass 72. Z-shaped blades 76 or butterfly blades 78 are powered via first blade drive motor 58 and second blade drive motor 62. This shreds and mixes the deposited waste materials, which are then fed into pressurized feed process vessel 18.

The shredded waste materials in pressurized feed process vessel 18 are heated by heating ducting 26 to a temperature within the range of approximately room temperature (70 degrees Fahrenheit) to 600 degrees Fahrenheit. This allows moisture in the shredded waste materials to evaporate. In a preferred embodiment, the waste materials are heated to a temperature of 212 degrees to 600 degrees Fahrenheit to ensure a sterilization of the waste. The combination of mechanical agitation, vessel pressure, friction heat and heat from heating ducting 26 enables the waste materials to be heated to the desired temperature. Auger 80 is powered by auger drive motor 66 and is configured to extrude the heated waste materials out of extrusion outlet 24 in any sized and shaped fuel blocks 32 or fuel chunks 34. The hot fuel blocks 32 or fuel chunks 34 cool to form the final product for reuse. In one embodiment, the bottom of pressurized feed process vessel 18 comprises bottom drop door 82. This enables a user to open bottom drop door 82 to remove the heated waste materials as one or more large chunks instead of using auger 80 to extrude the waste through extrusion outlet 24. Control system 16 is operably connected to pressurized feed process vessel 18 and heating ducting 26 to monitor the waste processing environment and control the temperature, pressure, volume, and residence time of the waste in pressurized feed process vessel 18. It shall be appreciated that control system 16 may comprise any electrical components and software known in the field to carry out the functions of the system described herein.

Fuel blocks 32 and fuel chunks 34 may be used in a variety of applications. For example, fuel blocks 32 may be used as a coal replacement in existing power plants. Existing coal burning power plants equipped with scrubbing equipment can safely handle the cleaner emissions, and the blocks are advantageous because they are dry, consistent in make-up, and carry high energy content comparable to coal. Fuel blocks 32 can also be used directly as a fuel replacement and be further processed into fuel products and/or into plastic lumber products. Fuel chunks 34 can be placed in gasifiers to produce synthetic gas, which can serve as energy to run electric generators. Since fuel blocks 32 and fuel chunks 34 are odorless and sterilized, a user can easily transport and store these items for prolonged periods of time. It shall be appreciated that fuel blocks 32 and fuel chunks 34 are not considered waste materials and therefore users are not required to obtain permits to handle, ship and store these items.

The evaporated moisture from the heated waste materials are removed from pressurized feed process vessel 18 by vacuum system 14 and processed by water purification system 102 as depicted in FIG. 5. When certain waste materials such as mixed plastics are heated in pressurized feed process vessel 18, harmful chemicals known as constituents of concern (COCs) are emitted, which may comprise chlorine or other chemicals. Water purification system 102, comprises steam condensate storage system 22 and chemical cleansing system 20 to remove the COCs from the moisture/water.

In water purification system 102, the evaporated moisture from pressurized feed process vessel 18 is transported to first stainless steel tank 86 by vacuum system 14. The moisture condenses and forms hot water in the bottom of first stainless steel tank 86. The hot water is transported to a first filter 88 to absorb and remove the COCs from the water. In a preferred embodiment, filter 88 is an activated carbon charcoal cartridge. However, other similar-type devices or filters known in the field that are capable of absorbing COCs may be used instead. The water is then pumped to ozone production system 90, which exposes ozone to the water to kill any microorganisms present, thereby sterilizing the water. The ozone exposed water is then transported and stored in second stainless steel tank 92 temporarily. The water in second stainless steel tank 92 is then transported to excess ozone destruction system 94. Excess ozone destruction system 94 comprises an ultraviolet ozone destruction component that removes excess ozone in the water via ultraviolet light. The water is then transported through a second filter 88 that is an activated carbon charcoal cartridge. This removes any remaining COCs in the water. The purified and sterilized water is then stored in fiberglass tank 98. The water in fiberglass tank 98 can then be pumped to a sewer system or designated for an alternative beneficial use. Filters 88 may be removed to properly discard the COCs and replaced as needed.

It shall be appreciated that the components of the waste processing system described in several embodiments herein may comprise any known materials in the field and be of any color, size and/or dimensions. It shall be appreciated that the components of the waste processing system described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A waste processing system to dry, condense and sterilize waste materials to a final product for reuse, the system configured to enhance efficiency while eliminating greenhouse gas emissions, the system comprising:
   a mixing chamber, comprising a waste hopper and blades configured to shred the waste materials, wherein the waste hopper is located above the blades;
   a pressurized chamber connected below to the mixing chamber and comprising a heating ducting attached to an inside surface of the mixing chamber and operated by a control system, the control system being configured to heat the waste materials received by the pressurized chamber from the mixing chamber to a temperature within a predetermined temperature range for a time period to eliminate moisture from the waste materials; and an auger housed at the bottom of the pressurized chamber and operably connected to an auger motor, wherein the auger is configured to extrude the heated waste materials through an outlet in the pressurized chamber to form the final product for reuse.

2. The waste processing system of claim 1, wherein the heating ducting comprises a hot oil jacket, surrounding the auger on three sides and configured to transfer heat to the waste materials.

3. The waste processing system of claim 2, wherein the blades of the mixing chamber comprise a pair of butterfly blades operably connected to a pair of blade motors; wherein each butterfly blade contains a rounded convex blade joined to a rounded concave transition wherein the rounded concave transition is connected to another rounded convex blade.

4. The waste processing system of claim 3, further comprising a door mounted to a bottom portion of the pressurized chamber.

5. The waste processing system of claim 3, further comprising a vacuum system operably connected to the pressurized chamber and configured to remove the moisture emitted from the heated waste materials in the chamber.

6. The waste processing system of claim 5, further comprising at least one storage tank operably connected to the pressurized chamber, wherein the at least one storage tank is configured to condense the moisture emitted from the waste materials into water.

7. The waste processing system of claim 6, further comprising at least one activated carbon charcoal cartridge connected to the at least one storage tank, wherein the at least one activated carbon charcoal cartridge is configured to absorb constituents of concern from the water stored in the at least one storage tank.

8. The waste processing system of claim 7, further comprising an ozone production system operably connected to the at least one storage tank, wherein the ozone production system is configured to expose ozone to the water from the at least one storage tank to sterilize the water.

9. The waste processing system of claim 8, further comprising an excess ozone destruction system operably connected to the at least one storage tank and comprising an ultraviolet ozone destruction component configured to remove excess ozone from the water stored in the at least one storage tank after being processed by the ozone production system.

10. The waste processing system of claim 9, further comprising a water disposal tank operably connected to the at least one storage tank and configured to store water processed by the at least one activated carbon charcoal cartridge, the ozone production system and the excess ozone destruction system.

11. The waste processing system of claim 1, wherein the heating ducting comprises electrical heating element inside of the heating ducting which is inside the pressurized chamber.

* * * * *